US011473608B2

(12) United States Patent
Kagami et al.

(10) Patent No.: US 11,473,608 B2
(45) Date of Patent: Oct. 18, 2022

(54) FASTENING STRUCTURE AND FASTENED STRUCTURAL BODY

(71) Applicant: TOYOTA JIDOSHA KABUSHIKI KAISHA, Toyota (JP)

(72) Inventors: Ayaka Kagami, Inazawa (JP); Yasuhide Matsuo, Toyota (JP); Koi Hata, Toyota (JP); Yasuhiro Nishibata, Toyota (JP); Kohei Takahashi, Nisshin (JP); Kosuke Sakurai, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 267 days.

(21) Appl. No.: 16/205,289

(22) Filed: Nov. 30, 2018

(65) Prior Publication Data

US 2019/0211864 A1    Jul. 11, 2019

(30) Foreign Application Priority Data

Jan. 9, 2018    (JP) .............................. JP2018-001344

(51) Int. Cl.
*F16B 25/10*    (2006.01)
*F16B 5/02*    (2006.01)
*F16B 25/00*    (2006.01)
*B21J 5/06*    (2006.01)
(Continued)

(52) U.S. Cl.
CPC .............. *F16B 25/103* (2013.01); *F16B 5/02* (2013.01); *F16B 25/0021* (2013.01); *F16B 25/106* (2013.01); *B21J 5/066* (2013.01); *F16B 1/0071* (2013.01); *F16B 17/008* (2013.01)

(58) Field of Classification Search
CPC .... F16B 25/106; F16B 25/10; F16B 25/0021; F16B 25/0031; F16B 25/103; F16B 5/02; F16B 5/0096; F16B 1/0071; B21J 5/066; B25H 7/02; B23J 49/00; Y10T 408/21
See application file for complete search history.

(56) References Cited

U.S. PATENT DOCUMENTS 2,991,551 A * 7/1961 Fogle .................... B21C 37/298
72/71
4,579,485 A * 4/1986 Connor ................. B23B 47/287
408/72 R
(Continued)

FOREIGN PATENT DOCUMENTS

CN        203412882 U    1/2014
DE    10 2010 050 979 A1   6/2011
(Continued)

OTHER PUBLICATIONS

NPL#1: Assembly Magazine—Flow Screws, Jan. 18, 2017, <https://web.archive.org/web/20170118182731/https://www.assemblymag.com/articles/93220-flow-drilling-screws-help-carmakers-shed-weight> (Year: 2017).*

*Primary Examiner* — Gary W Estremsky
(74) *Attorney, Agent, or Firm* — Oblon, McClelland, Maier & Neustadt, L.L.P.

(57) ABSTRACT

A fastening structure includes: plural overlapping co-fastened members, a clearance hole being formed at at least one mating face of mutual mating faces of the plural co-fastened members, and a screw utilizing frictional heat to bore a hole and form a thread, passing through the clearance hole, and fastening the plural co-fastened members together.

4 Claims, 12 Drawing Sheets

(51) Int. Cl.
*F16B 17/00* (2006.01)
*F16B 1/00* (2006.01)

(56) References Cited

U.S. PATENT DOCUMENTS

| | | | | | |
|---|---|---|---|---|---|
| 4,749,322 | A | * | 6/1988 | Sygnator | F16B 5/02 411/387.3 |
| 5,121,556 | A | * | 6/1992 | Moore | B25H 7/02 33/673 |
| 5,234,301 | A | * | 8/1993 | Grossberndt | B21J 5/066 411/386 |
| 5,915,891 | A | * | 6/1999 | Fridman | B23B 47/28 408/1 R |
| 6,193,455 | B1 | * | 2/2001 | Levey | F16B 37/048 411/179 |
| 2006/0137166 | A1 | * | 6/2006 | Babej | F16B 37/065 411/181 |
| 2013/0047414 | A1 | * | 2/2013 | Werthwein | F16B 25/106 29/525.12 |
| 2013/0195579 | A1 | * | 8/2013 | Freis | B21J 5/066 411/387.1 |
| 2013/0273312 | A1 | * | 10/2013 | Campbell | B29C 66/742 428/137 |
| 2015/0176623 | A1 | * | 6/2015 | Vogel | F16B 25/0063 411/387.4 |
| 2015/0275944 | A1 | * | 10/2015 | Duenisch | F16B 25/0021 411/386 |
| 2016/0009101 | A1 | | 3/2016 | Freis | |
| 2016/0091010 | A1 | * | 3/2016 | Freis | F16B 25/0021 411/387.1 |
| 2016/0325362 | A1 | * | 11/2016 | Ghadialy | B23Q 17/24 |
| 2017/0058934 | A1 | * | 3/2017 | Haak | F16B 11/006 |
| 2017/0130751 | A1 | * | 5/2017 | Norton | B29C 65/48 |
| 2017/0268231 | A1 | * | 9/2017 | Freis | E04C 2/08 |
| 2018/0128305 | A1 | * | 5/2018 | Freis | F16B 25/0015 |
| 2018/0291944 | A1 | * | 10/2018 | Iwano | F16B 25/106 |

FOREIGN PATENT DOCUMENTS

| | | | | |
|---|---|---|---|---|
| DE | 102010050979 A1 | * | 6/2011 | ............ F16B 25/10 |
| DE | 102015008719 A1 | * | 1/2017 | ............ F16B 25/106 |
| JP | 2004-082136 | | 3/2004 | |
| JP | 2011252576 A | * | 12/2011 | ............ F16B 25/10 |

* cited by examiner

RELATED ART

FASTENING STRUCTURE AND FASTENED STRUCTURAL BODY

CROSS-REFERENCE TO RELATED APPLICATION

This application claims priority under 35 USC 119 from Japanese Patent Application No. 2018-1344 filed Jan. 9, 2018, the disclosure of which is incorporated by reference herein in its entirety.

BACKGROUND

Technical Field

The present disclosure relates to a fastening structure and a fastened structural body.

Related Art

Flow drill screws (registered trademark) are known to fasten an overlapped first member and second member together by utilizing frictional heat to bore a hole and form a thread. However, swarf generated during thread formation may be extruded between a mating face of the first member and a mating face of the second member, resulting in a gap forming between the mating faces.

Thus, in United States Patent Application Publication No. 2016/0091010, a groove is formed in an outer face of at least one of the first member or the second member, thereby reducing swarf generated during thread formation, and suppressing formation of a gap.

SUMMARY

However, in the configuration disclosed in US No. 2016/0091010, the advantageous effect of suppressing formation a gap between the mating faces is insufficient, and there is room for improvement.

In consideration of the above circumstances, the present disclosure suppresses formation of a gap between mating faces of co-fastened members after being fastened together by a screw that utilizes frictional heat to bore a hole and form a thread.

A first aspect of the present disclosure is a fastening structure including plural overlapped co-fastened members, a clearance hole being formed at at least one mating face of mutual mating faces of the plural co-fastened members, and a screw that utilizes frictional heat to bore a hole and form a thread, that passes through the clearance hole, and that fastens the plural co-fastened members together.

In the fastening structure of the first aspect, the screw utilizes frictional heat to bore a hole and form a thread when fastening the plural overlapped co-fastened members together. Swarf generated as a result of thread formation by the screw is extruded into the clearance hole. This suppresses formation of a gap between the mutual mating faces of the co-fastened members after being fastened together.

A fastening structure of a second aspect of the present disclosure is the fastening structure of the first aspect, wherein the clearance hole has a circular external profile in a plan view, and a marker indicating the external profile of the clearance hole is provided at an outer face of an outermost co-fastened member.

In the fastening structure of the second aspect, despite the clearance hole not being visible during fastening, the screw can be positioned using the marker indicating the external profile of the circular clearance hole, thereby enabling the screw to be easily fastened so as to pass through the clearance hole.

A fastening structure of a third aspect of the present disclosure is the fastening structure of the first aspect, wherein a protruding marker or an indented marker indicating a fastening position of the screw is provided at an outer face of an outermost co-fastened member, at a position other than a position corresponding to an axial center of the screw.

In the fastening structure of the third aspect, the indented or protruding marker indicating the fastening position of the screw is provided at a position other than the position corresponding to the axial center of the screw, such that the position corresponding to the axial center is a flat face. Thus, for example, the screw is prevented or suppressed from moving to be off the axial center when fastening with the screw commences.

A fastening structure of a fourth aspect of the present disclosure is the fastening structure of the second aspect or the third aspect, wherein a recess that is recessed away from a threaded portion of the screw is formed at a back face of a head of the screw, and the marker protrudes, and is provided at a position superimposed on the recess in a plan view.

In the fastening structure of the fourth aspect, the protruding marker is provided at a position superimposed on the recess formed at the back face of the screw head in plan view, such that the protruding marker is not pinched between the back face of the screw head and the outer face of the co-fastened member.

A fastening structure of a fifth aspect of the present disclosure is the fastening structure of the first aspect, wherein a counterbore to accommodate a head of the screw is formed at an outer face of an outermost co-fastened member.

In the fastening structure of the fifth aspect, the screw can be positioned and the screw head can sit more stably after fastening due to forming the counterbore at the outer face of the co-fastened member.

A fastening structure of a sixth aspect of the present disclosure is the fastening structure of any one of the first aspect to the fifth aspect, wherein an in-plane direction width of the clearance hole is wider than a thread diameter of the screw.

In the fastening structure of the sixth aspect, the in-plane direction width of the clearance hole is wider than the thread diameter of the screw, such that swarf generated during thread formation is effectively extruded into the clearance hole, and formation of a gap between the mating faces of the co-fastened members after being fastened together is effectively suppressed.

A fastening structure of a seventh aspect of the present disclosure is the fastening structure of any one of the first aspect to the sixth aspect, wherein a co-fastened member formed with the clearance hole is formed from extruded aluminum or die-cast aluminum.

In the fastening structure of the seventh aspect, a co-fastened member is formed from extruded aluminum or die-cast aluminum, such that the clearance hole is easily formed.

A fastened structural body of an eighth aspect of the present disclosure includes plural overlapped co-fastened members in which a clearance hole is formed at at least one mating face of mutually overlapped mating faces of the plural co-fastened members, and a fastened section in which swarf generated as a result of thread formation is extruded into the clearance hole by using the fastening structure of any one of the first aspect to the seventh aspect.

In the fastened structural body of the eighth aspect, swarf is extruded into the clearance hole at the fastened section by using the fastening structure of any one of the first aspect to the seventh aspect. Thus, either a gap is not formed, or only a small gap is formed, between the mating faces of the co-fastened members in the fastened structural body.

A ninth aspect of the present disclosure is a fastened structural body including plural overlapped co-fastened members in which a clearance hole is formed at at least one mating face of mutually overlapped mating faces of the plural co-fastened members, wherein swarf generated as a result of thread formation is extruded into the clearance hole, and swarf generated as a result of thread formation is extruded into the recess in the screw, by using the fastening structure of the fourth aspect.

In the fastened structural body of the ninth aspect, swarf is extruded into the clearance hole in the mating face of the co-fastened member and swarf is also extruded into the recess in the screw, by using the fastening structure of the fourth aspect. Thus, either a gap is not formed, or only a small gap is formed, between the mating faces of the co-fastened members in the fastened structural body.

The fastening structure of the first aspect enables formation of a gap between the mating faces of the co-fastened members after being fastened together to be suppressed.

The fastening structure of the second aspect enables the screw to be easily passed through the clearance hole during fastening.

The fastening structure of the third aspect enables the screw to be prevented or suppressed from moving to be off the axial center or the like when fastening with the screw commences.

The fastening structure of the fourth aspect enables the protruding marker to be prevented from being pinched between the back face of the screw head and the outer face of the co-fastened member.

The fastening structure of the fifth aspect enables the screw to be positioned and the screw head to sit more stably after fastening due to forming the counterbore in the outer face of the co-fastened member.

The fastening structure of the sixth aspect enables swarf generated during thread formation to be effectively extruded into the clearance hole, and formation of a gap between the mating faces of the co-fastened members after being fastened together to be effectively suppressed.

The fastening structure of the seventh aspect enables the clearance hole to be easily formed in the co-fastened member.

In the fastened structural bodies of the eighth aspect and the ninth aspect, either a gap is not formed, or only a small gap is formed, between the mating faces of the co-fastened members in the fastened structural body.

BRIEF DESCRIPTION OF THE DRAWINGS

Preferred embodiments will be described in detail based on the following figures, wherein.

DETAILED DESCRIPTION

First Exemplary Embodiment

Explanation follows regarding a fastening structure and a fastened structural body according to a first exemplary embodiment of the present disclosure, with reference to FIG. 1, FIG. 2, FIG. 9, and FIG. 11. Note that the T direction indicated by the arrow T is a screw fastening direction. The letter G indicates a position corresponding to a screw axial center.

Prior to Screw Fastening

Figure 1:
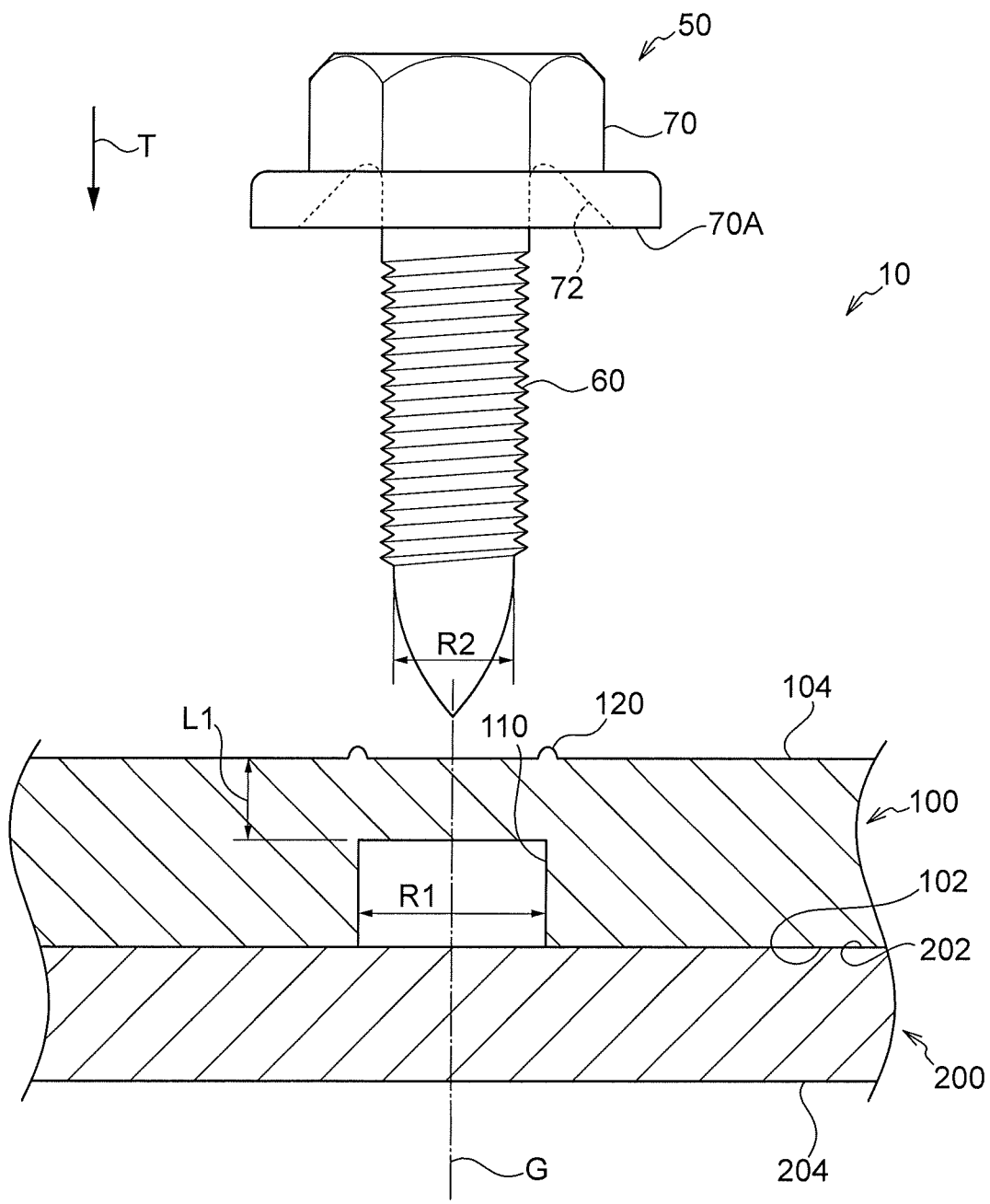
FIG. 1 is a cross-section illustrating a fastening structure of a first exemplary embodiment of the present disclosure, as sectioned along a fastening direction.

As illustrated in FIG. 1, in a fastening structure 10, a first member 100 and a second member 200, serving as examples of co-fastened members, are overlapped and fastened together using a screw 50. Note that the first member 100 and the second member 200 are sheet-form vehicle configuration members formed of a metal material, and are made of die-cast aluminum in the present exemplary embodiment. In the present exemplary embodiment, a plate thickness of the first member 100 is thicker than a plate thickness of the second member 200.

Note that a face of the first member 100 that is in contact with the second member 200 is referred to as a first mating face 102, and a face on the opposite side of the first member 100 is referred to as a first outer face 104. Similarly, a face of the second member 200 that is in contact with the first member 100 is referred to as a second mating face 202, and a face on the opposite side of the second member 200 is referred to as a second outer face 204.

The screw 50 of the present exemplary embodiment is a flow drill screw (FDS, registered trademark) that fastens together the co-fastened members (the first member 100 and the second member 200 in the present exemplary embodiment) by utilizing frictional heat to bore a hole and form a thread. The screw 50 includes a head 70 and a threaded portion 60. A recess 72 that is recessed away from the threaded portion 60 is formed in a back face 70A of the head 70. The recess 72 is formed with a ring-shaped external profile in plan view.

Prior to fastening with the screw 50, a clearance hole 110 is formed at the first mating face 102 where the first member 100 contacts the second member 200. The clearance hole 110 is formed at a fastening position to be fastened by the screw 50.

Figure 9:
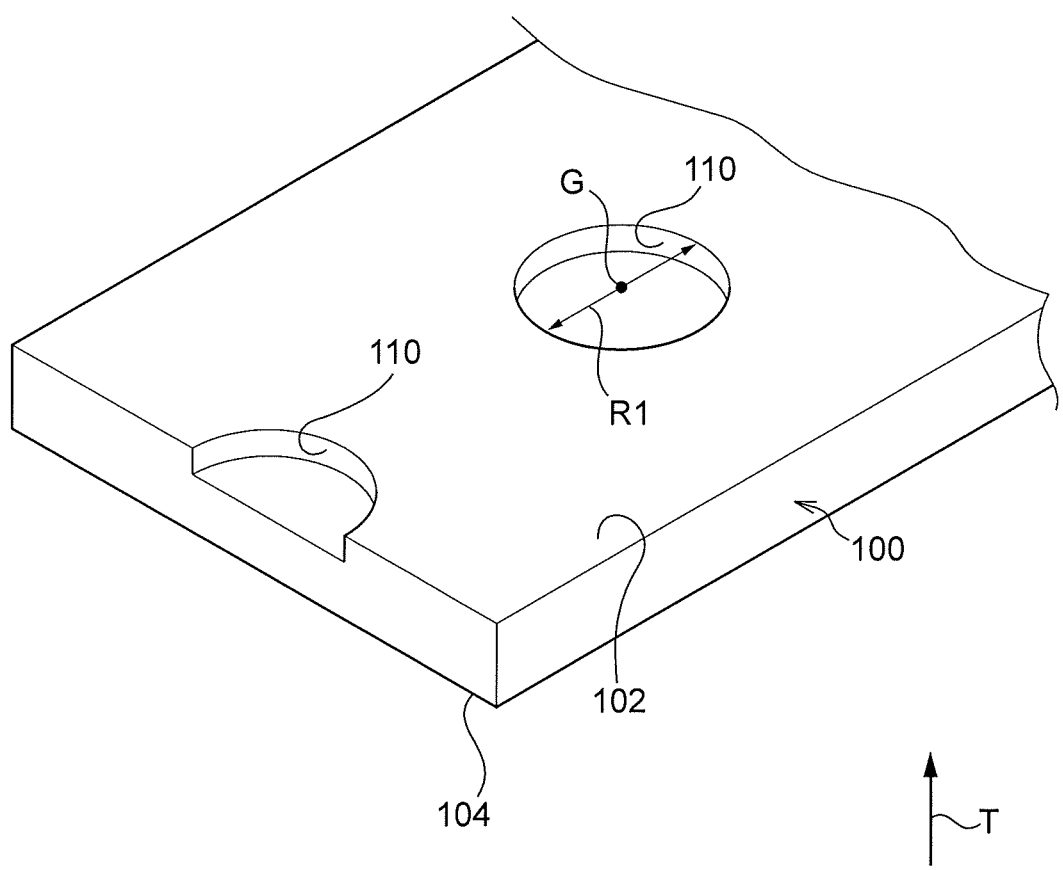
FIG. 9 is a perspective view illustrating clearance holes formed in a first mating face of a first member.

As illustrated in FIG. 9, the clearance hole 110 is formed with a circular external profile in plan view. In the present exemplary embodiment, plural clearance holes 110 are formed in the first mating face 102 at spacings in an in-plane direction (a direction orthogonal to the fastening direction), so as to correspond to the fastening positions to be fastened using the screws 50 (see FIG. 1).

As illustrated in FIG. 1, a diameter (in-plane direction width) R1 (see FIG. 9 also) of each clearance hole 110 is wider than a thread diameter R2 of the threaded portion 60 of the screw 50. In the present exemplary embodiment, the thread diameter R2 is 5 mm, and so the diameter R1 of the clearance hole 110 is set at 7 mm or greater. A thickness L1 of the first member 100 at the location where the clearance hole 110 is formed is set between 1.5 mm and 2.0 mm. Note that in FIG. 1 and the other drawings, the thickness is illustrated so as to appear greater than the actual thickness in order to aid comprehension of the drawings.

Figure 11A:
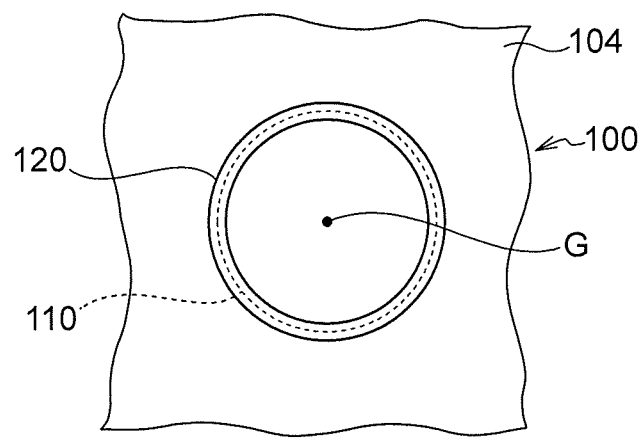
FIG. 11A is a plan view illustrating a rib formed at an outer face of a first member.
Figure 11B:
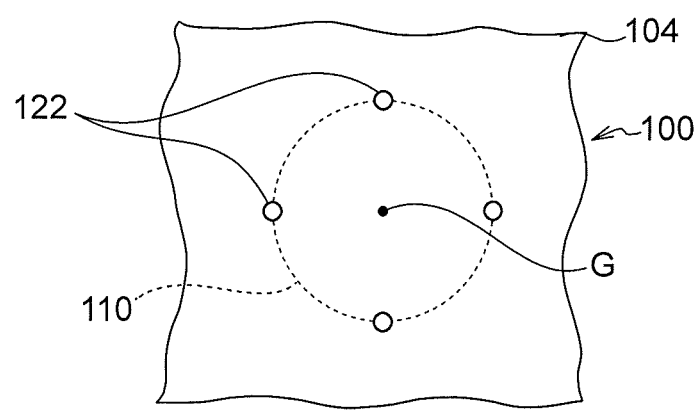
FIG. 11B is a plan view illustrating plural protrusions formed at an outer face of a first member.

As illustrated in FIG. 1 and FIG. 11A, a rib 120, serving as an example of a marker, is formed on the first outer face 104, this being on the opposite side of the first member 100 to the first mating face 102. As illustrated in FIG. 11A, the rib 120 is formed in a ring shape in plan view. As illustrated in FIG. 11A and FIG. 1, the rib 120 is formed so as to be superimposed on the external profile of the clearance hole 110.

As illustrated in FIG. 1, the rib 120 is formed at a position that, in plan view, would be superimposed with the recess 72 in the head 70 of the screw 50 when fastened.

Note that as previously described, the first member 100 is made of die-cast aluminum. The clearance hole 110 and the rib 120 are accordingly formed during casting.

Screw Fastening and Fastened Structural Body Post-Fastening

Figure 2:
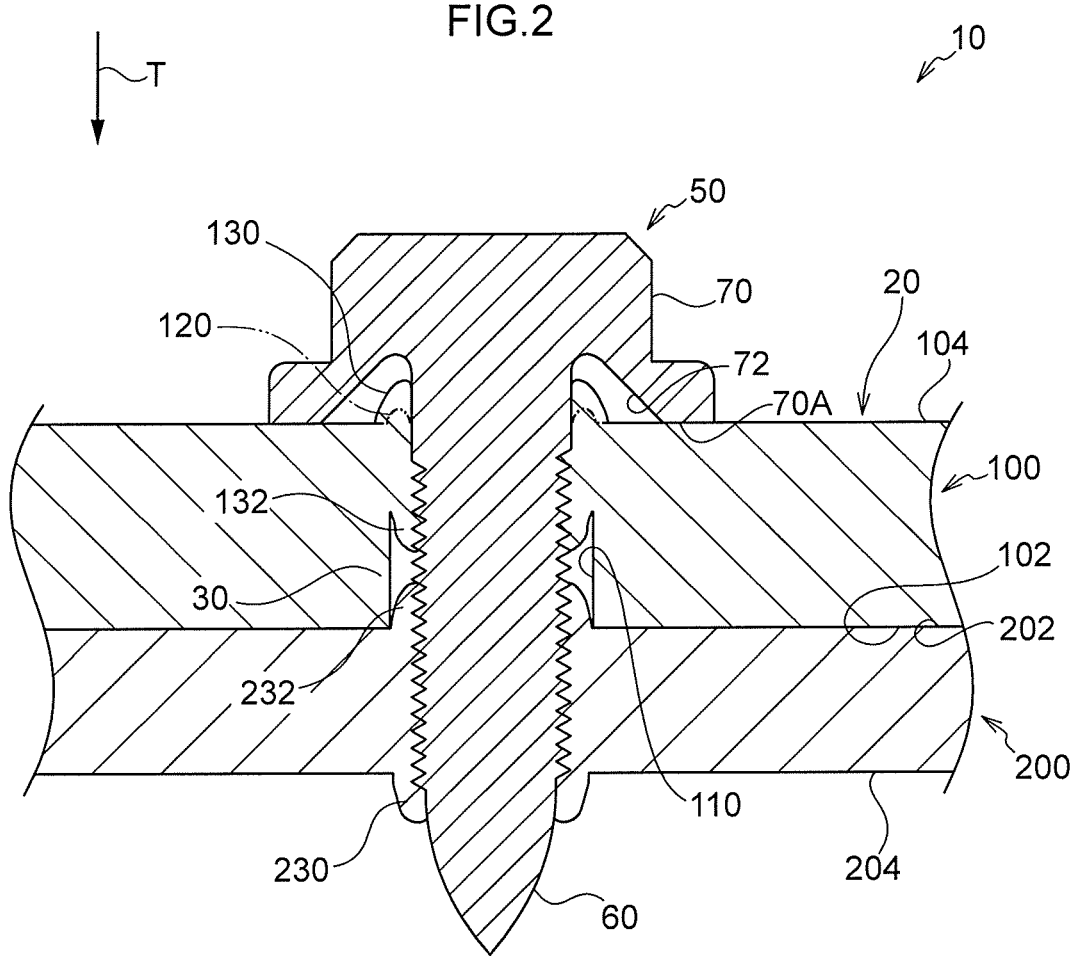
FIG. 2 is a cross-section illustrating a fastened structural body of the first exemplary embodiment of the present disclosure, as sectioned along a fastening direction.

As illustrated in FIG. 1 and FIG. 2, in a state in which the first member 100 and the second member 200 have been overlapped and stacked on one another, the screw 50 is positioned using the rib 120 on the first outer face 104 of the first member 100 as a marker. The screw 50 is then rotated, thereby utilizing frictional heat to bore a hole through the first member 100 and the second member 200 and form a thread, and thereby fasten the two members together.

Note that as illustrated in FIG. 2, a fastened structural body 20 is configured after the first member 100 and the second member 200 have been fastened together by the screw 50. Note that a location of the fastened structural body 20 where the first member 100 and the second member 200 have been fastened together by the screw 50 configures a fastened section 30.

Following fastening, swarf generated during thread formation by the screw 50 is extruded and mounds up on the first outer face 104 and the second outer face 204 to respectively form a first boss 130 and a second boss 230. The first boss 130 of the first member 100 is contained within the recess 72 in the head 70 of the screw 50. The rib 120 is incorporated into the first boss 130.

Since the threaded portion 60 of the screw 50 passes through the clearance hole 110, swarf generated as a result of thread formation by the screw 50 is extruded into the clearance hole 110 formed in the first mating face 102 of the first member 100 to form extruded portions 132, 232. Namely, the clearance hole 110 in the fastened section 30 is at least partially filled by the extruded portions 132, 232.

Operation and Advantageous Effects

Explanation follows regarding operation and advantageous effects of the present exemplary embodiment.

As illustrated in FIG. 1, the clearance hole 110 is formed in the first mating face 102 of the first member 100, and as illustrated in FIG. 2, the threaded portion 60 of the screw 50 passes through the clearance hole 110. Thus, swarf generated as a result of thread formation by the screw 50 is extruded into the clearance hole 110 to form the extruded portions 132, 232.

As illustrated in FIG. 9, in the present exemplary embodiment, plural clearance holes 110 are formed with spacings therebetween such that fastening using plural screws 50 can be conducted.

As illustrated in FIG. 1 and FIG. 11A, the rib 120, configuring a marker of the external profile of the clearance hole 110, is provided at the first outer face 104 of the first member 100 at an upstream side in the fastening direction of the screw 50 (the arrow T direction). This enables the screw 50 to be positioned using the rib 120 as a marker during fastening, despite the clearance hole 110 not being visible, and enables the screw 50 to be fastened so as to pass through the clearance hole 110.

Note that the rib 120 is at a location separated from the axial center position and that the first outer face 104 has a flat face at the axial center position G and surrounding the axial center position G Thus, for example, the screw 50 is prevented or suppressed from moving to be off the axial center when fastening with the screw 50 commences.

The rib 120 is provided at a position that is superimposed on the recess 72 formed in the back face 70A of the head 70 of the screw 50 in plan view. The rib 120 is thus prevented from being pinched between the back face 70A of the head 70 of the screw 50 and the first outer face 104.

Note that the clearance hole 110 and the rib 120 are easy to form since the first member 100 is made of die-cast aluminum.

Figure 12:
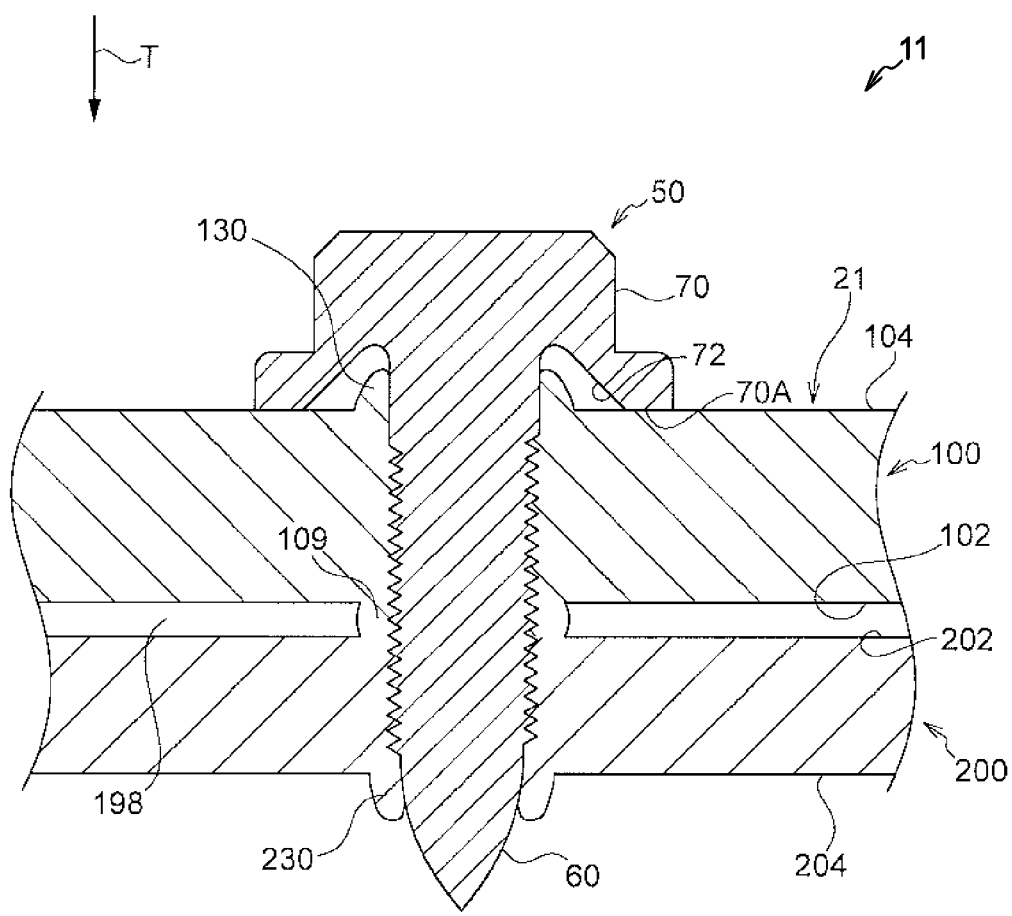
FIG. 12 is a cross-section illustrating a fastened structural body of a Comparative Example, as sectioned along a fastening direction.

Explanation follows regarding a fastening structure 11 and a fastened structural body 21 of a Comparative Example illustrated in FIG. 12, in which the clearance hole 110 (see FIG. 1) is not formed at the first mating face 102 of the first member 100.

Swarf generated as a result of thread formation by the screw 50 is sometimes extruded between the first mating face 102 and the second mating face 202 to form an extruded portion 109. There is a possibility that the extruded portion 109 may be trapped between the first mating face 102 and the second mating face 202 so as to form a gap 198, leading, for example, to deterioration of the component precision of the fastened structural body 21.

In contrast thereto, in the fastening structure 10 and the fastened structural body 20 of the present exemplary embodiment as described above, swarf generated as a result of thread formation by the screw 50 is extruded into the clearance hole 110 formed at the first mating face 102 to form the extruded portions 132, 232. This suppresses formation of the gap 198 (see FIG. 12) between the first mating face 102 and the second mating face 202.

To explain from a different perspective, either no gap 198 (see FIG. 12) is formed between the first mating face 102 and the second mating face 202 of the fastened structural body 20, or, even if a gap 198 (see FIG. 12) does form, this gap 198 is smaller than that in the Comparative Example (see FIG. 12).

As illustrated in FIG. 1, the diameter R1 of the clearance hole 110 is set so as to be wider than the thread diameter R2 of the threaded portion 60 of the screw 50. This enables the threaded portion 60 of the screw 50 to pass entirely through the clearance hole 110. This suppresses the extruded portions 132, 232 from being squeezed out from inside the clearance hole 110, such that formation of a gap (see FIG. 12) is even more effectively suppressed.

Note that although not illustrated in the drawings, it would be conceivable to form a through-hole in the first member 100, such that the extruded portions 132, 232 (see FIG. 2) form within the through-hole, thereby suppressing formation of a gap 198 (see FIG. 12). However, forming a through-hole in the first member 100 would, for example, reduce the fastening strength of the fastened structural body post-fastening and generate a concentration of stress. Such an approach is therefore not preferable.

Second Exemplary Embodiment

Figure 3:
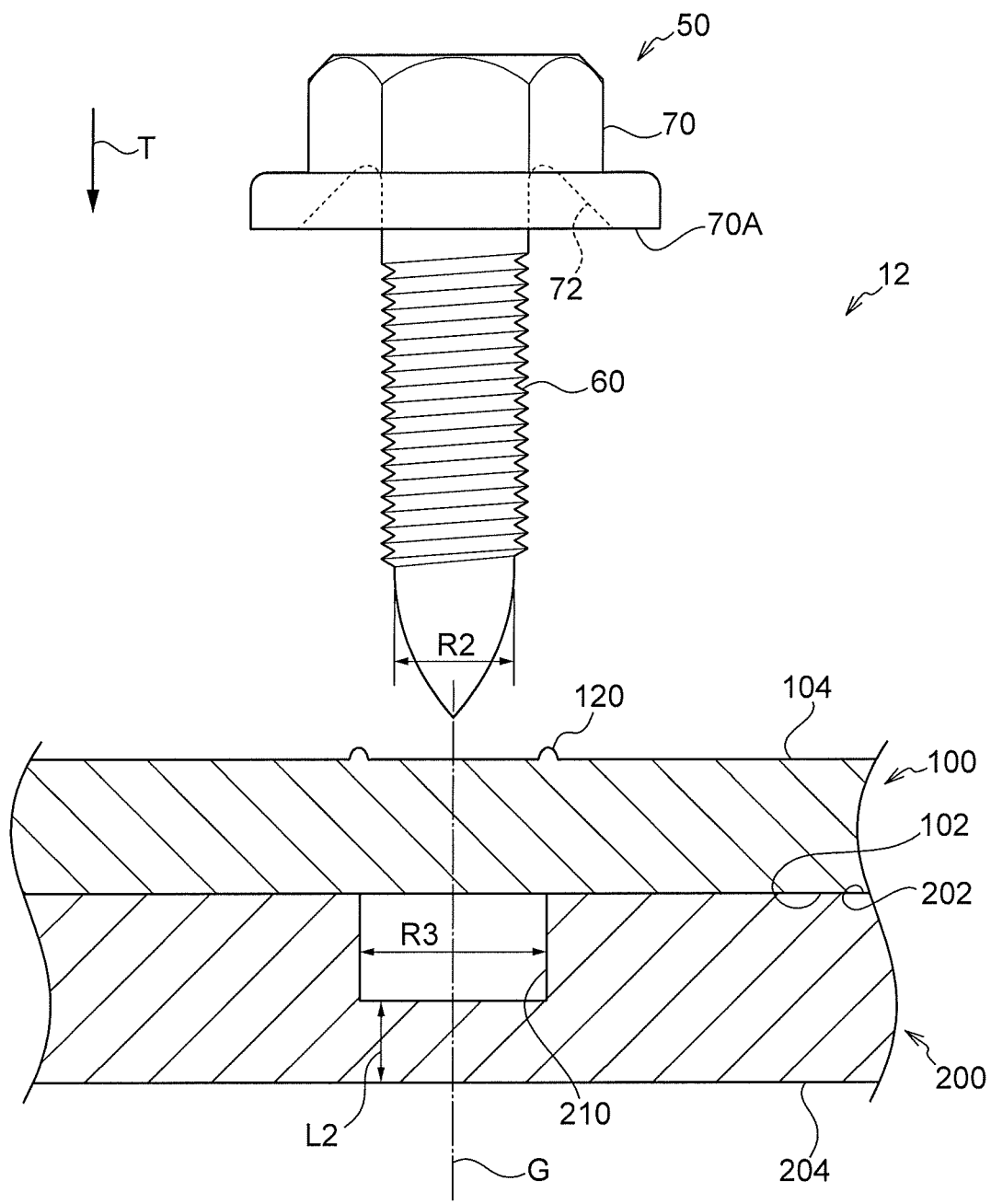
FIG. 3 is a cross-section illustrating a fastening structure of a second exemplary embodiment of the present disclosure, as sectioned along a fastening direction.
Figure 4:
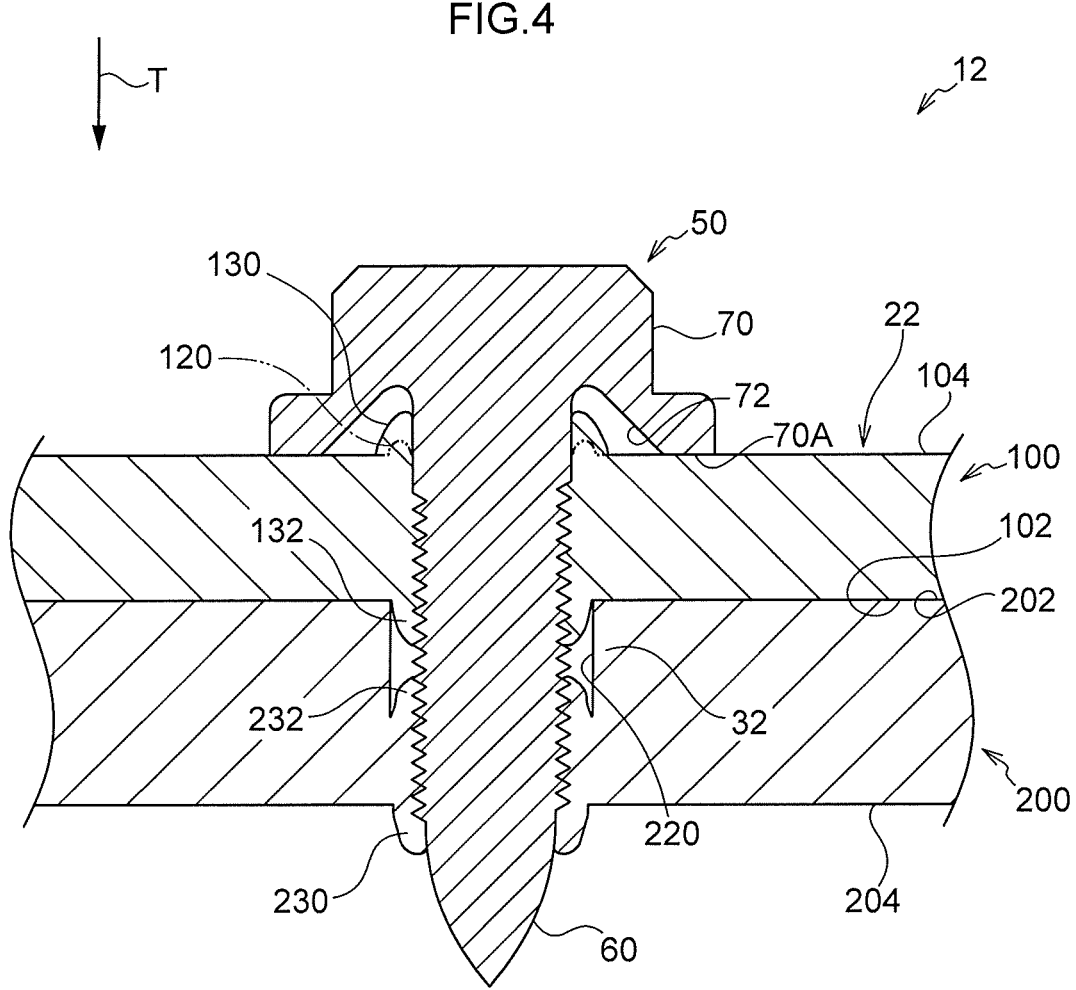
FIG. 4 is a cross-section illustrating a fastened structural body of the second exemplary embodiment of the present disclosure, as sectioned along a fastening direction.

Explanation follows regarding a fastening structure and a fastened structural body according to a second exemplary embodiment of the present disclosure, with reference to FIG. 3 and FIG. 4. Note that members similar to those in the first exemplary embodiment are appended with the same reference numerals, and duplicate explanation thereof is omitted or simplified.

Prior to Screw Fastening

As illustrated in FIG. 3, in a fastening structure 12, a first member 100 and a second member 200 are overlapped and fastened together by the screw 50. Note that in the present exemplary embodiment, the plate thickness of the second member 200 is thicker than the plate thickness of the first member 100, and a clearance hole 210 is formed at the second mating face 202 where the second member 200 contacts the first member 100. Although not illustrated in the drawings, similarly to the clearance holes 110, plural clearance holes 210 are formed in the second mating face 202 with spacings therebetween in the in-plane direction (see FIG. 9) so as to correspond to fastening positions to be fastened by the screws 50.

In the fastening structure 12, each clearance hole 210 is formed in a circular shape in plan view, and a diameter (in-plane direction width) R3 of each clearance hole 210 is set so as to be wider than the thread diameter R2 of the threaded portion 60 of the screw 50. Note that in the present exemplary embodiment, the thread diameter R2 is 5 mm, and the diameter R3 of the clearance hole 210 is set at 10 mm or greater.

Note that in the first exemplary embodiment previously described, the diameter R1 of the clearance hole 110 (see FIG. 1) is set at 7 mm or greater with respect to a thread diameter R2 of 5 mm, while in the present exemplary embodiment, as described above, the minimum value of the diameter R3 is 3 mm greater, being set at 10 mm or greater. This is in consideration of in-plane direction precision (tolerance) when overlapping the first member 100 and the second member 200.

A thickness L2 of the second member 200 at the location where the clearance hole 210 is formed is set so as to be between 1.5 mm and 2.0 mm. As previously described, the second member 200 is made of die-cast aluminum. The clearance hole 210 is accordingly formed during casting.

Screw Fastening and Fastened Structural Body Post-Fastening

As illustrated in FIG. 3 and FIG. 4, similarly to in the first exemplary embodiment, in a state in which the first member 100 and second member 200 have been overlapped and stacked on one another, the screw 50 is positioned using the rib 120 on the first outer face 104 of the first member 100 as a marker. The screw 50 is then rotated, thereby utilizing frictional heat to bore a hole through the first member 100 and the second member 200 and form a thread, and thereby fasten the two members together.

Note that as illustrated in FIG. 4, a fastened structural body 22 is configured after the first member 100 and the second member 200 have been fastened together by the screw 50. A location of the fastened structural body 22 where the first member 100 and the second member 200 have been fastened together by the screw 50 configures a fastened section 32.

Following fastening, swarf generated as a result of thread formation by the screw 50 is extruded and mounds up on the first outer face 104 and the second outer face 204 to form a first boss 130 and a second boss 230. The first boss 130 of the first member 100 is contained within the recess 72 in the head 70 of the screw 50. The rib 120 is incorporated into the first boss 130.

Since the threaded portion 60 of the screw 50 passes through the clearance hole 210, swarf generated as a result of thread formation by the screw 50 is extruded into the clearance hole 210 formed at the second mating face 202 to form extruded portions 132, 232. Namely, the clearance hole 210 in the fastened section 32 is at least partially filled by the extruded portions 132, 232 that have been extruded.

Operation and Advantageous Effects

Explanation follows regarding operation and advantageous effects of the present exemplary embodiment.

As illustrated in FIG. 3, the clearance hole 210 is formed at the second mating face 202 of the second member 200, and as illustrated in FIG. 4, the threaded portion 60 of the screw 50 passes through the clearance hole 210. Thus, swarf generated as a result of thread formation by the screw 50 is extruded into the clearance hole 210 formed in the second mating face 202 to form the extruded portions 132, 232, thereby suppressing formation of a gap 198 (see FIG. 12) between the first mating face 102 and the second mating face 202.

To explain from a different perspective, either no gap 198 (see FIG. 12) is formed between the first mating face 102 and the second mating face 202 of the fastened structural body 22, or, even if a gap 198 (see FIG. 12) does form, this gap 198 is smaller than that in the Comparative Example (see FIG. 12).

Third Exemplary Embodiment

Figure 5:
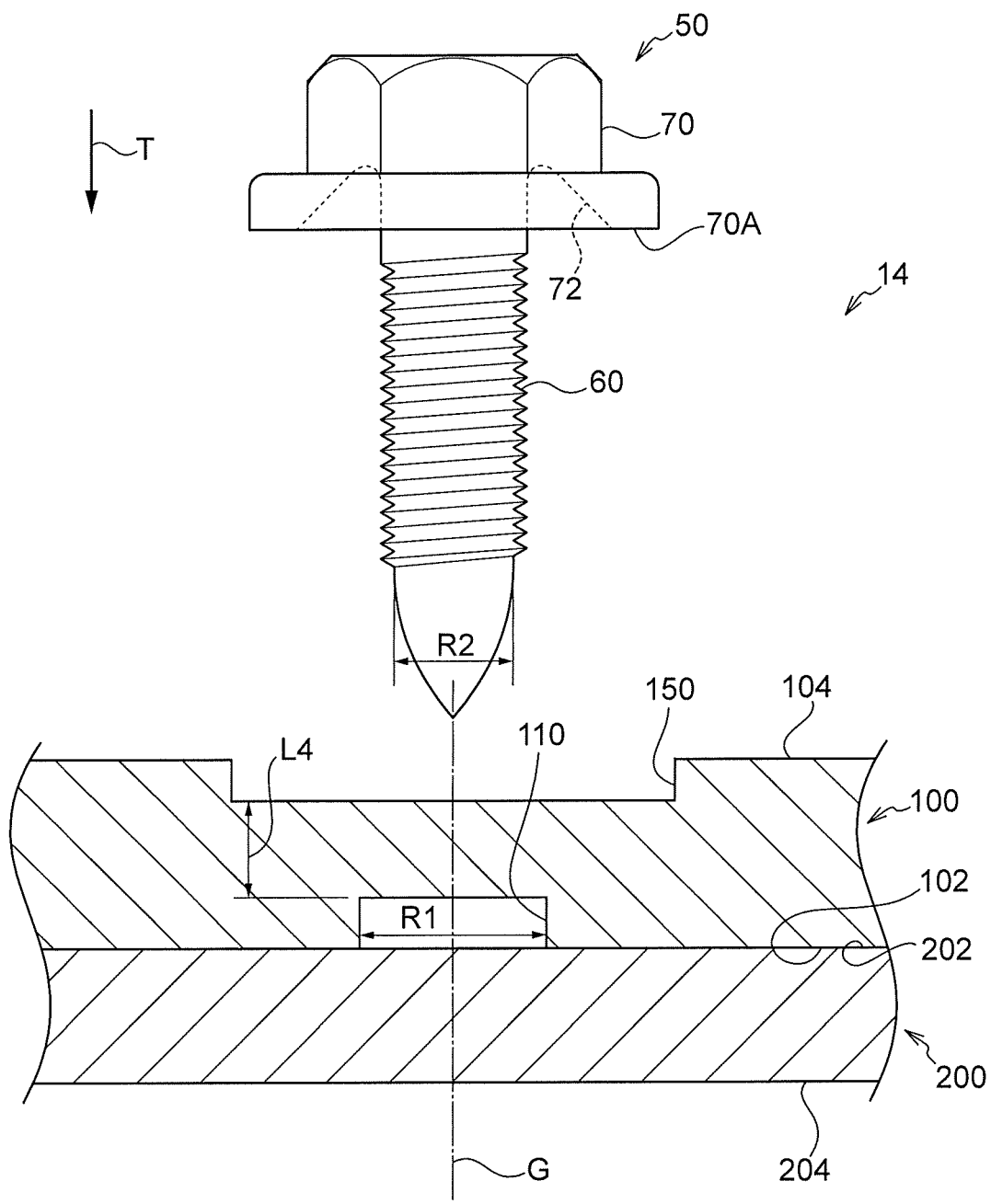
FIG. 5 is a cross-section illustrating a fastening structure of a third exemplary embodiment of the present disclosure, as sectioned along a fastening direction.
Figure 6:
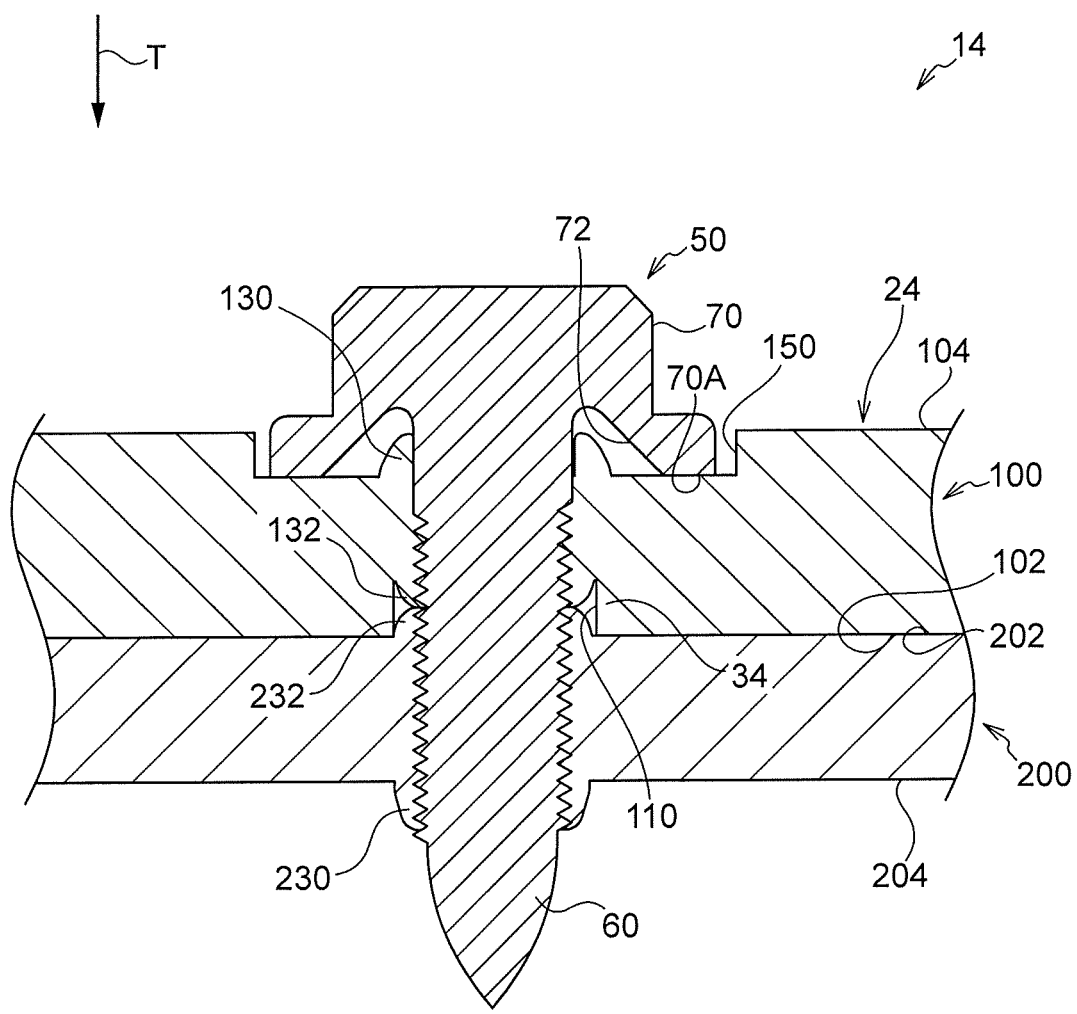
FIG. 6 is a cross-section illustrating a fastened structural body of the third exemplary embodiment of the present disclosure, as sectioned along a fastening direction.

Explanation follows regarding a fastening structure and a fastened structural body according to a third exemplary embodiment of the present disclosure, with reference to FIG. 5 and FIG. 6. Note that members similar to those in the first exemplary embodiment and second exemplary embodiment are appended with the same reference numerals, and duplicate explanation thereof is omitted or simplified.

Prior to Screw Fastening

As illustrated in FIG. 5, in a fastening structure 14, the first member 100 and second member 200 are overlapped and fastened together using the screw 50. Note that in the present exemplary embodiment, the plate thickness of the first member 100 is thicker than the plate thickness of the second member 200, and the clearance hole 110 is formed at the first mating face 102 of the first member 100 that contacts the second member 200.

In the present exemplary embodiment, a counterbore 150 with a circular shape in plan view and that accommodates the head 70 of the screw 50 is formed at the first outer face 104 that is on the opposite side of the first member 100 to the first mating face 102. In plan view, the counterbore 150 has a larger external profile than the clearance hole 110, and is formed such that the centers of the counterbore 150 and the clearance hole 110 are aligned, or substantially aligned (see FIG. 6 also).

A thickness L4 of the first member 100 at a location where the clearance hole 110 and the counterbore 150 are formed is set so as to be between 1.5 mm and 2.0 mm.

As previously described, the first member 100 is made of die-cast aluminum. The clearance hole 110 and the counterbore 150 are accordingly formed during casting.

Screw Fastening and Fastened Structural Body Post-Fastening

As illustrated in FIG. 5 and FIG. 6, in a state in which the first member 100 and second member 200 have been overlapped and stacked on one another similarly to in the first exemplary embodiment, the screw 50 is positioned on the first outer face 104 of the first member 100 using the counterbore 150. The screw 50 is then rotated, thereby utilizing frictional heat to bore a hole through the first member 100 and the second member 200 and form a thread, and thereby fasten the two members together. The head 70 of the screw 50 is accommodated within the counterbore 150.

Note that as illustrated in FIG. 6, a fastened structural body 24 is configured after the first member 100 and the second member 200 have been fastened together by the screw 50. A location of the fastened structural body 24 where the first member 100 and the second member 200 have been fastened together by the screw 50 configures a fastened section 34.

Following fastening, swarf generated as a result of thread formation by the screw 50 is extruded and mounds up on the first outer face 104 and the second outer face 204 to respectively form a first boss 130 and a second boss 230. The first boss 130 of the first member 100 is contained within the recess 72 in the head 70 of the screw 50.

Since the threaded portion 60 of the screw 50 passes through the clearance hole 110, swarf generated as a result of thread formation by the screw 50 is extruded into the clearance hole 110 formed in the first mating face 102 of the first member 100 to form extruded portions 132, 232. Namely, the clearance hole 110 in the fastened section 34 is at least partially filled by the extruded portions 132, 232 that have been extruded.

Operation and Advantageous Effects

Explanation follows regarding operation and advantageous effects of the present exemplary embodiment.

As illustrated in FIG. 5, the clearance hole 110 is formed at the first mating face 102 of the first member 100, and as illustrated in FIG. 6, the threaded portion 60 of the screw 50 passes through the clearance hole 110. Thus, swarf generated as a result of thread formation by the screw 50 is extruded into the clearance hole 110 formed in the first mating face 102 to form the extruded portions 132, 232, thereby suppressing formation of a gap 198 (see FIG. 12) between the first mating face 102 and the second mating face 202.

To explain from a different perspective, either no gap 198 (see FIG. 12) is formed between the first mating face 102 and the second mating face 202 of the fastened structural body 24, or, even if a gap 198 (see FIG. 12) does form, this gap 198 is smaller than that in the Comparative Example (see FIG. 12).

Since positioning is performed using the counterbore 150, there is no need to form the rib 120 (see FIG. 1) or the like. Moreover, the head 70 of the screw 50 sits more stably after fastening due to the counterbore 150.

Fourth Exemplary Embodiment

Figure 7:
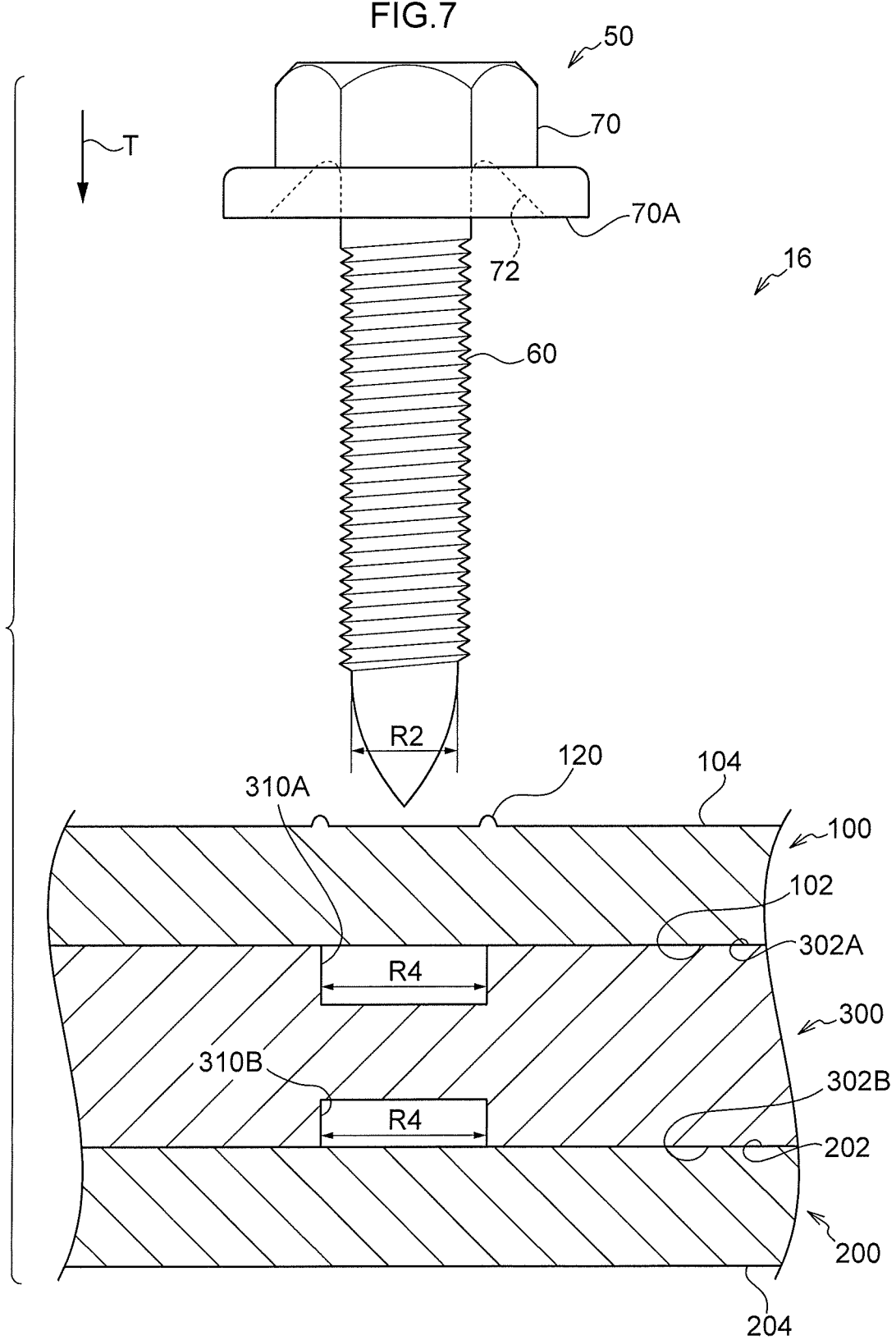
FIG. 7 is a cross-section illustrating a fastening structure of a fourth exemplary embodiment of the present disclosure, as sectioned along a fastening direction.
Figure 8:
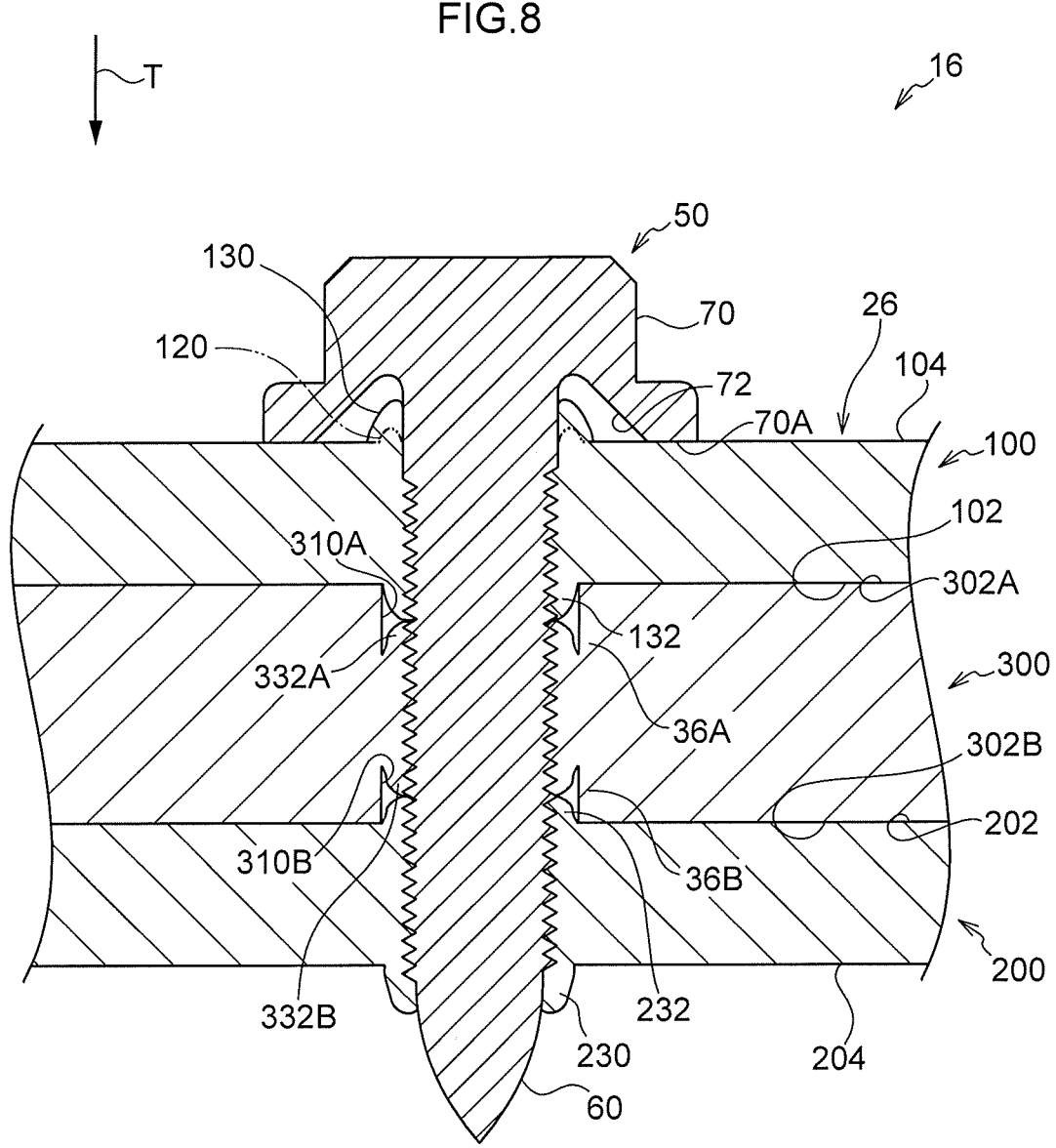
FIG. 8 is a cross-section illustrating a fastened structural body of the fourth exemplary embodiment of the present disclosure, as sectioned along a fastening direction.

Explanation follows regarding a fastening structure and a fastened structural body according to a fourth exemplary embodiment of the present disclosure, with reference to FIG. 7 and FIG. 8. Note that members similar to those in the first exemplary embodiment, second exemplary embodiment, and third exemplary embodiment are appended with the same reference numerals, and duplicate explanation thereof is omitted or simplified.

Prior to Screw Fastening

As illustrated in FIG. 7, in a fastening structure 16, the first member 100 and second member 200, serving as examples of co-fastened members, are overlapped and fastened together by the screw 50. Note that in the present exemplary embodiment, a third member 300 is also overlapped so as to be sandwiched between the first member 100 and the second member 200. The first member 100, the second member 200, and the third member 300 are sheet-form vehicle configuration members formed of a metal material, and are made of die-cast aluminum in the present exemplary embodiment. Note that in the present exemplary embodiment, the plate thicknesses of the first member 100 and the second member 200 are the same, and the plate thickness of the third member 300 is thicker than the plate thicknesses of the first member 100 and the second member 200.

A face of the first member 100 that is in contact with the third member 300 is referred to as the first mating face 102, and the face on the opposite side of the first member 100 is referred to as the first outer face 104. A face of the second member 200 that is in contact with the third member 300 is referred to as the second mating face 202, and the face on the opposite side of the second member 200 is referred to as the second outer face 204. A face of the third member 300 that is in contact with the first member 100 is referred to as a third mating face 302A, and a face of the third member 300 that is in contact with the second member 200 is referred to as a third mating face 302B.

Prior to fastening with the screw 50, a clearance hole 310A is formed at the third mating face 302A where the third member 300 contacts the first member 100, and a clearance hole 310B is formed at the third mating face 302B where the third member 300 contacts the second member 200. Note that clearance hole 310A and the clearance hole 310B each have a circular external profile in plan view, and are formed so as to be superimposed at the same position as each other. Note that although not illustrated in the drawings, similarly to the clearance holes 110 of the first exemplary embodiment, plural clearance holes 310A, 310B are formed in the respective third mating faces 302A, 302B with spacings therebetween in the in-plane direction (see FIG. 9) so as to correspond to fastening positions to be fastened using the screws 50.

A diameter (in-plane direction width) R4 of each of the clearance holes 310A, 310B is wider than the thread diameter R2 of the threaded portion 60 of the screw 50.

The rib 120 is formed on the first outer face 104, this being on the opposite side of the first member 100 to the first mating face 102, and is formed so as to be superimposed on the external profiles of the clearance holes 310A, 310B in plan view.

As previously described, the third member 300 is made of die-cast aluminum. The clearance holes 310A, 310B are accordingly formed during casting.

Screw Fastening and Fastened Structural Body Post-Fastening

As illustrated in FIG. 7 and FIG. 8, in a state in which the third member 300 has been overlapped so as to be stacked sandwiched between the first member 100 and the second member 200, the screw 50 is positioned using the rib 120 on the first outer face 104 of the first member 100 as a marker. The screw 50 is then rotated, thereby utilizing frictional heat to bore a hole through the first member 100, the second member 200, and the third member 300 and form a thread, and thereby fasten the three members together.

Note that as illustrated in FIG. 8, a fastened structural body 26 is configured after the first member 100, the second member 200, and the third member 300 have been fastened together by the screw 50. A location of the fastened structural body 26 where the first member 100 and the third member 300 have been fastened together by the screw 50 configures a fastened section 36A, and a location of the fastened structural body 26 where the second member 200 and the third member 300 have been fastened together by the screw 50 configures a fastened section 36B.

Following fastening, swarf generated as a result of thread formation by the screw 50 is extruded and mounds up on the first outer face 104 and the second outer face 204 to respectively form a first boss 130 and a second boss 230. The first boss 130 of the first member 100 is contained within the recess 72 in the head 70 of the screw 50. The rib 120 is incorporated into the first boss 130.

Since the threaded portion 60 of the screw 50 passes through the clearance hole 310A, swarf from the first member 100 and the third member 300 generated as a result of thread formation by the screw 50 is extruded into the clearance hole 310A formed in the third mating face 302A to form extruded portions 132, 332A. Similarly, since the threaded portion 60 of the screw 50 passes through the clearance hole 310B, swarf from the second member 200 and the third member 300 generated as a result of thread formation by the screw 50 is extruded into the clearance hole 310B formed at the third mating face 302B to form extruded portions 232, 332B. Namely, the clearance hole 310A at the fastened section 36A is at least partially filled by the extruded portions 132, 332A that have been extruded, and the clearance hole 310B at the fastened section 36B is at least partially filled by the extruded portions 232, 332B that have been extruded.

Operation and Advantageous Effects

Explanation follows regarding operation and advantageous effects of the present exemplary embodiment.

As illustrated in FIG. 7, the clearance holes 310A, 310B are respectively formed at the third mating faces 302A, 302B of the third member 300, and as illustrated in FIG. 8, the threaded portion 60 of the screw 50 passes through the clearance holes 310A, 310B. Thus, swarf generated as a result of thread formation by the screw 50 is extruded into the clearance holes 310A, 310B respectively formed in the third mating faces 302A, 302B of the third member 300 to form the extruded portions 132, 232, 332A, and 332B. This suppresses formation of gaps 198 (see FIG. 12) between the first mating face 102 and the third mating face 302A, and between the second mating face 202 and the third mating face 302B.

To explain from a different perspective, either no gap 198 (see FIG. 12) is formed between the first mating face 102 and the third mating face 302A, or between the second mating face 202 and the third mating face 302B, of the fastened structural body 26, or, even if gaps 198 (see FIG. 12) do form, these gap 198 are smaller than those in the Comparative Example (see FIG. 12).

Other Examples

Note that the present disclosure is not limited to the above exemplary embodiments.

For example, the clearance hole 110 is formed at the first mating face 102 of the first member 100 in the first exemplary embodiment and the third exemplary embodiment, and the clearance hole 210 is formed at the second mating face 202 of the second member 200 in the second exemplary embodiment. However, clearance holes may be formed in both the first mating face 102 of the first member 100 and the second mating face 202 of the second member 200.

Moreover, for example, although the counterbore 150 is formed at the first outer face 104 of the first member 100 in the third exemplary embodiment, configuration is not limited thereto. A counterbore 150 may be also formed in the first outer face 104 of the first member 100 in the second exemplary embodiment and in the fourth exemplary embodiment.

Moreover, for example, although the clearance holes 310A, 310B are respectively formed at the third mating faces 302A, 302B of the third member 300 in the fourth exemplary embodiment, configuration is not limited thereto. For example, configuration may be such that only one of the clearance hole 310A in the third mating face 302A or the clearance hole 310B in the third mating face 302B is formed in the third member 300. Alternatively, for example, a clearance hole 110 may be formed at the first mating face 102 of the first member 100 rather than at the third mating face 302A, and a clearance hole 210 may be formed at the second mating face 202 of the second member 200 rather than at the third mating face 302B.

Figure 10:
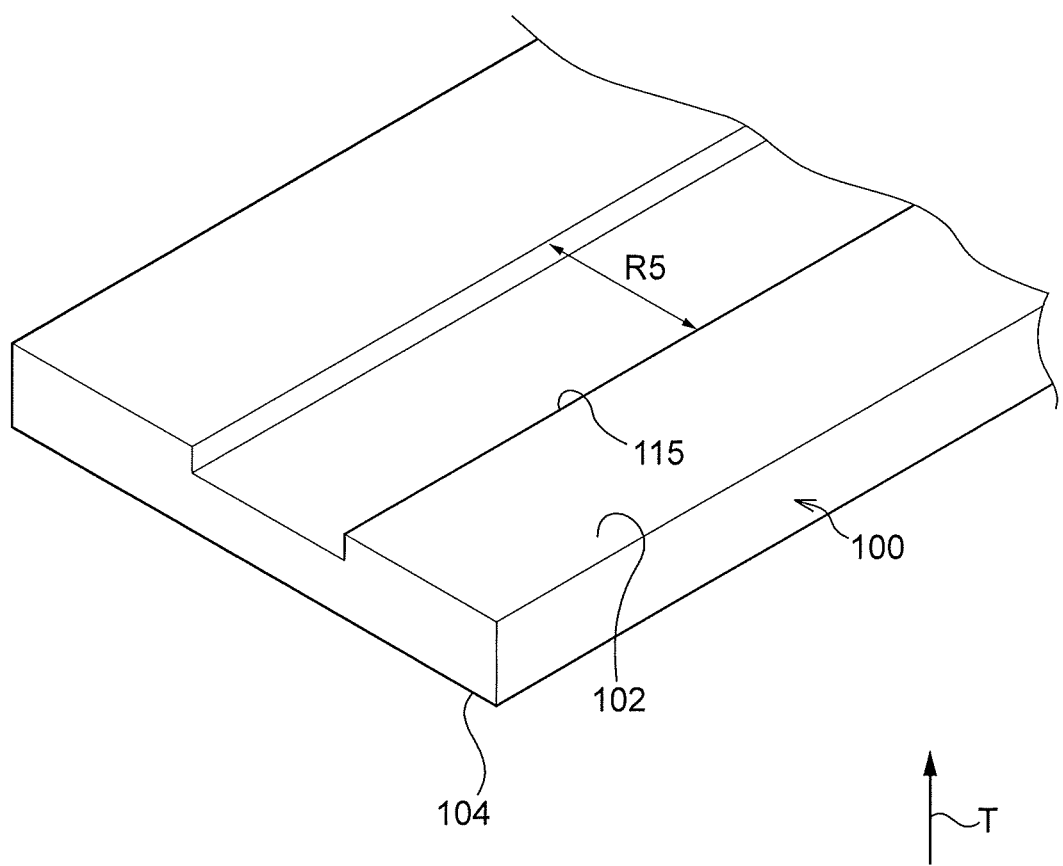
FIG. 10 is a perspective view illustrating a groove formed in a first mating face of a first member.

Moreover, for example, although in the above exemplary embodiments plural clearance holes 110 are formed with spacings therebetween in the in-plane direction as illustrated in FIG. 9, configuration is not limited thereto. As illustrated in FIG. 10, for example, a groove 115 that passes through the fastening positions may be formed instead. In such cases, a groove width R5 of the groove 115 is preferably set so as to be wider than the thread diameter R2 (see FIG. 1) of the screw 50. Forming the groove 115 in this manner enables the spacings between where the screws 50 are fastened to be freely set. Likewise, the clearance holes 210, 310A, and 310B may also be formed by grooves.

Figure 11C:
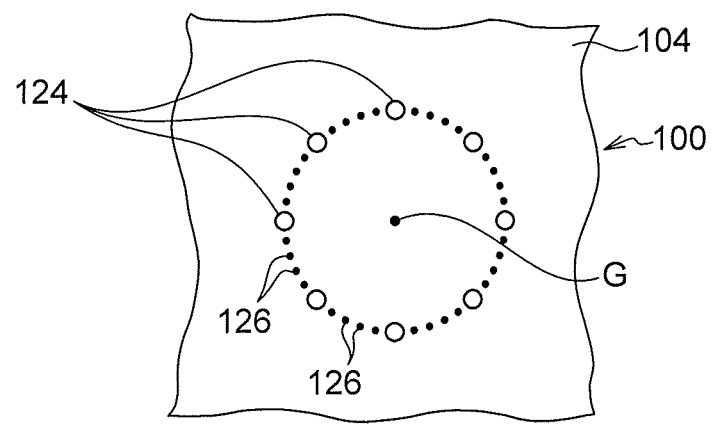
FIG. 11C is a plan view illustrating plural protrusions, and plural dots between the protrusions, formed at an outer face of a first member.

Moreover, for example, although the ring-shaped rib 120 (see FIG. 11A) indicating the external profile of the clearance hole 110, 210, 310A, or 310B serves as a positioning marker for the screw 50 in the first exemplary embodiment, third exemplary embodiment, and fourth exemplary embodiment, configuration is not limited thereto. As illustrated in plan view in FIG. 11B, for example, plural (four in the present example) protrusions 122 may be provided as markers. Alternatively, as illustrated in FIG. 11C, plural (eight in the present example) protrusions 124 may be provided, and dots (small depressions) 126 may be provided between these protrusions 124. Moreover, although not illustrated in the drawings, indented locations, such as ring-shaped grooves or plural depressions, may be provided instead of protruding locations such as the ribs 120 or the protrusions 122, 124.

The marker for positioning the screw 50 when fastening the screw 50 does not need to indicate the external profile of the clearance hole 110, 210, 310A, or 310B. For example, although not illustrated in the drawings, a location in the form of a ring-shaped clearance hole or protrusion that is smaller than the external profile of the clearance hole 110, 210, 310A, or 310B and larger than the external profile of the threaded portion 60 of the screw 50 may be provided. Alternatively, a color may be applied to the first outer face 104 of the first member 100 to serve as a positioning marker. Any form of marker for positioning the screw 50 during fastening would be suitable. However, the first outer face 104 at the axial center position G is preferably a planar face.

Moreover, for example, although the first member 100, the second member 200, and the third member 300 are die-cast aluminum members in the above exemplary embodiments, configuration is not limited thereto. For example, these members may be made of extruded aluminum. Alternatively, the members may be formed from another metal, such as sheet steel. The present disclosure may also be applied in cases in which metals of different types are fastened together, such as in cases in which the first member 100 is an aluminum member and the second member 200 is a steel sheet.

Although the present disclosure is applied when fastening two or three members together in the above exemplary embodiments, configuration is not limited thereto. The present disclosure may also be applied when fastening four or more members together.

In the above exemplary embodiments, although the co-fastened members, specifically, the first member 100, the second member 200, and the third member 300, are automotive configuration members, configuration is not limited thereto. The present disclosure may also be applied when fastening together non-automotive co-fastened members. For example, the present disclosure may be applied when fastening together members configuring an aircraft, members configuring a railroad car, members configuring a ship, members configuring heavy machinery, or members configuring general machinery.

Plural of the above-described exemplary embodiments may also be implemented in appropriate combinations. Various modifications may also be implemented within a range not departing from the scope of the present disclosure.

What is claimed is:

1. A fastening structure comprising:
   a plurality of overlapping co-fastened members, a clearance hole being formed at least one mating face of mutual mating faces of the plurality of co-fastened members;
   a screw utilizing frictional heat to bore a hole and form a thread, passing through the clearance hole, and fastening the plurality of co-fastened members together, wherein the clearance hole has a circular external profile in a plan view;
   a marker indicating the circular external profile of the clearance hole provided at an outer face of an outermost co-fastened member; and
   a recess that is recessed away from a threaded portion of the screw formed at a back face of a head of the screw,
   wherein the marker protrudes and is provided at a position superimposed on the recess in a plan view,
   wherein the marker is at a location separated from an axial center position of the screw,
   wherein the marker is incorporated into a boss that is formed with swarf, which is generated during thread formation by the screw and which is extruded and mounds up on the outer face of the outermost co-fastened member, and the marker is contained within the recess at the head of the screw, and
   wherein the marker comprises a plurality of protrusions that are disposed in a ring shape in plan view.

2. The fastening structure of claim 1, wherein an in-plane direction width of the clearance hole is wider than a thread diameter of the screw.

3. The fastening structure of claim 1, wherein a co-fastened member formed with the clearance hole is formed from extruded aluminum or die-cast aluminum.

4. A fastened structural body comprising:
   a plurality of overlapped co-fastened members in which a clearance hole is formed at least one mating face of mutually overlapped mating faces of the plurality of co-fastened members; and
   a fastened section in which the swarf generated as a result of thread formation is extruded into the clearance hole by using the fastening structure of claim 1.

* * * * *